Patented Apr. 9, 1940

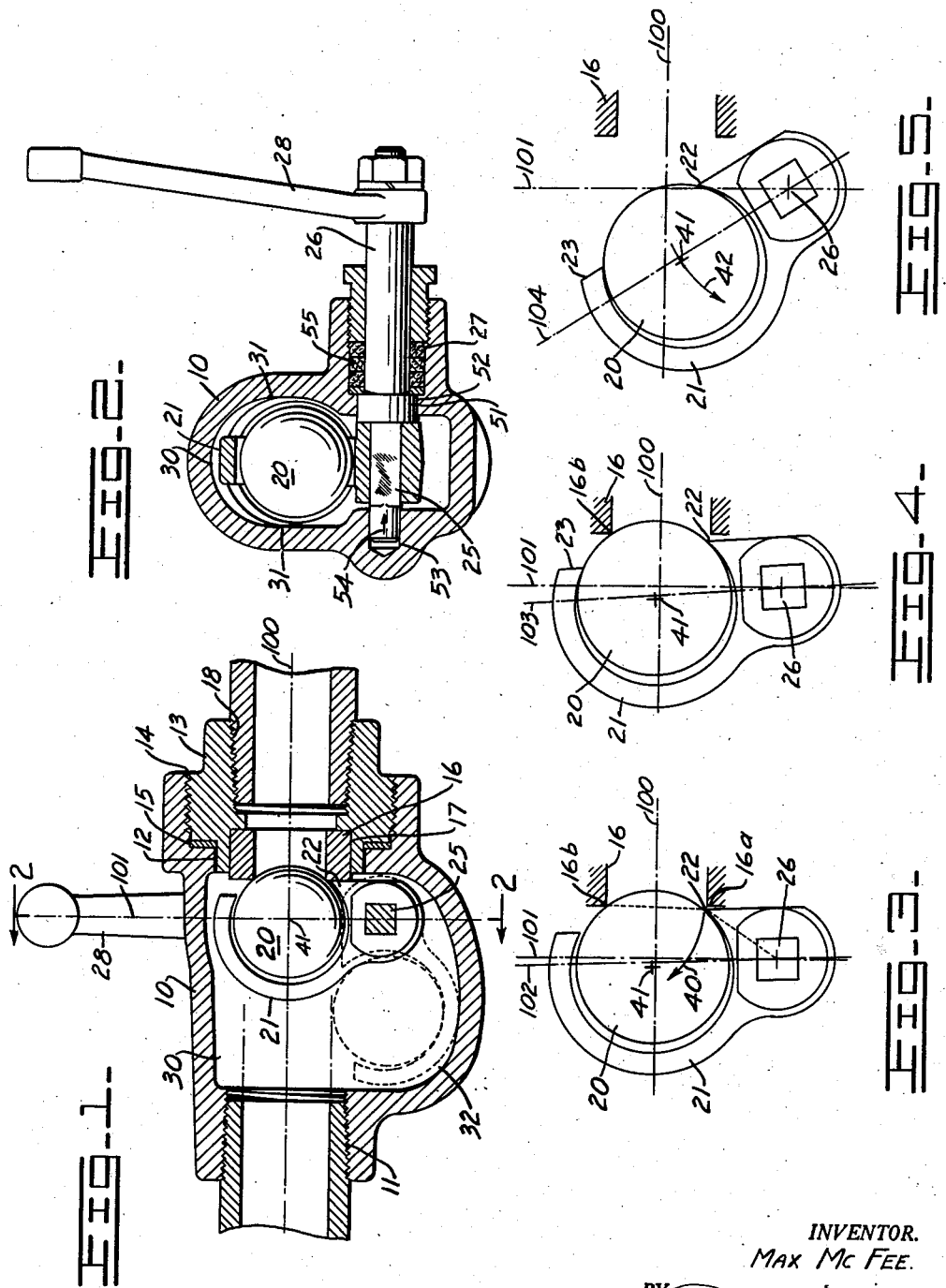

2,196,503

UNITED STATES PATENT OFFICE 2,196,503

BALL VALVE

Max McFee, Lansing, Mich., assignor to Food Machinery Corporation, San Jose, Calif., a corporation of Delaware Application June 12, 1939, Serial No. 278,675

6 Claims. (Cl. 251—125)

My invention relates to valves of the type in which a ball is seated in an orifice to stop the flow of the medium, means being provided for removing the ball from its seat in order to open the valve.

One of the objects of my invention is to provide a ball-type valve that is so constructed as to tend to occupy either of two extreme positions, namely, fully open, or fully closed. Particularly when controlling the flow of fluids containing an abrasive, and when operating under high pressures, a valve which can be partially opened soon deteriorates, due to the rapid wearing away of the seat on account of the extremely high velocity of flow through the restricted opening. Accordingly, I provide a valve which cannot be left in a partially open position.

Another object of my invention is to provide a ball-type valve in which the means for unseating the ball is not disposed in the discharge orifice, because if the means for operating the ball passes through the orifice, the diameter of the orifice has to be increased to obtain the required effective cross sectional area in the orifice. This in turn causes an increase in the load on the ball, which results in increasing the amount of effort necessary to unseat the ball.

Still another object of my invention is to provide a ball-type valve in which the ball is entirely removed from the path of flow of the medium to the orifice when the valve is open.

A further object of my invention is to provide a ball-type valve in which the ball actuator is disposed in the valve chamber and at one side, so that in the open-valve position, it does not obstruct the flow.

Another object of my invention is to provide a device for removing the ball from its seat, which exerts its greatest actuating force on the ball during the initial portion of the opening movement, at which time the maximum resistance is encountered.

Another object of my invention is to provide a ball-type valve in which the flow of the medium tends to maintain the ball in either its fully closed or its fully open position, so that the ball must be positively moved from one position to the other, and so that no means need be provided to hold the ball in its open position.

Other objects of my invention will appear in the course of the description of a device in which my invention has been embodied.

In the drawing:

Fig. 1 is a longitudinal sectional view through the valve body.

Fig. 2 is a transverse section taken on line 2—2 of Fig. 1.

Figs. 3, 4, and 5 illustrate various stages in the removal of the ball from its seat.

In Fig. 1 is shown a valve body 10 having a threaded aperture 11 for connection to a pipe, or the like, for introducing the medium into the valve. In coaxial alignment with aperture 11 is aperture 12, which is adapted to receive a plug 13 threaded into the valve body 10 at 14, and provided at 15 with a suitable seal. The cylindrical valve seat of hardened metal 16 is pressed into an aperture 17 in the plug 13 which is coaxial with the threaded aperture 18, the latter being provided for attachment to a pipe or the like for conducting the medium away from the valve. It will be noted that seat 16 is coaxial with aperture 11, the common axis being indicated by the line 100. This line represents also the straight line flow of the medium through the valve.

The ball 20 is adapted to contact the seat 16 to stop flow of the medium. The ball 20 is cradled in a C-shaped arm 21, attached to the squared end 25 of a shaft 26 which extends laterally (Fig. 2) outside of the valve body through a suitable stuffing box 27 to an operating handle 28. Movement of handle 28 causes the ball to be seated or unseated.

A collar 51 formed on shaft 26 adjacent squared-end 25 fits rotatively in an aperture 52 in the valve body 10. A cylindrical aperture 53 is provided to receive and support the inner end of shaft 26. Due to the fact that the medium can enter aperture 53 around the end of the shaft, pressure is exerted by the medium on the shaft in the direction of arrow 54. Thus the outer fan of collar 51 is urged against the packing 55 tending to prevent leakage from the valve around shaft 26 and also applying a frictional resistance which opposes rotation of shaft 26 and helps to hold the valve in its fully open position.

The interior of the valve body 10 is formed to provide two communicating chambers: a flow chamber and a side chamber. The flow chamber 30 appears in Fig. 1 as the upper part of the interior of the valve body 10 through which passes the axis of flow 100. Side chamber 32 opens off flow chamber 30 to provide a pocket to receive the ball 20 and its actuator 21 when the valve is in the open position indicated in dotted lines in Fig. 1.

Flow chamber 30 is substantially semi-cylindrical (Fig. 2) and is designed to confine the ball 20 within the grip of the C-shaped arm 21. The side walls 31 of the chamber 30 are located a distance apart only slightly greater than the diameter of the ball 20, so that the ball 20 cannot escape from the C-shaped arm 21 by lateral movement therefrom. These walls 31 extend downwardly (Fig. 1) in parallelism to form the side walls of the pocket 32, so that the ball 20 is maintained within the grip of the actuator 21 throughout its full travel from closed to open position. The pressure of the medium tends to maintain the ball on its seat in the closed position shown in full lines in Fig. 1, and when the valve is open as indicated in dotted lines, the flow of the medium tends to maintain the ball in such position, due to its offset relation to the axis of flow 100 through the valve body.

Thus, when the ball 20 and its actuator 21 have been moved to the open-valve position in which they lie in the pocket 32 the flow chamber 30 is left entirely open for unobstructed flow of the medium along line 100 through the valve body from the inlet through the orifice to the outlet. While this straight-line path of flow is the preferred arrangement it is possible to locate the inlet aperture 11 otherwise than coaxially with the outlet. It could be placed at an angle, as, for example, at right angles, to the axis 100, without, however, sacrificing the value of the open flow chamber construction. The ball and actuator would still be located in the pocket 32 outside the path of flow. The only difference would be that the path of flow instead of being in a straight line would be in a curved or angular line.

The particular manner in which the ball is removed from its seat will now be described by reference to Figs. 3, 4, and 5. In all of these figures 101 represents the angular position of the operating lever 28 with respect to the pivotal axis 26 in its initial or closed-valve position. In Fig. 3, 102 represents its angular position when the initial valve opening operation has begun. This is effected by means of a ball-engaging portion 22 on actuator 21 being brought into contact with the ball 20 near one side 16a of the seat 16. As the lever 28 was moved from 101 to 102, the portion 22 in engaging the ball 20 caused the ball to roll in the direction of arrow 40, about the opposite edge 16b of seat 16 as a fulcrum, the action being that of a compound lever, the fulcrums of which are 16b and the pivotal axis 26, and the lever arms indicated by the dotted lines 22—26, 22—16b.

The lever arm 22—26 is made as short as the structural design will permit. In the disclosed embodiment of the invention the shaft 26 was placed close to the front wall of pocket 32 and close to the ball 20 so that point 22 could be brought in to the edge of the seat 16a and so that distance 22—26 would be a minimum. This short lever arm enables the operator to apply a greatly magnified force against the ball to move it initially against what is the maximum resistance, namely, the pressure of the medium holding the ball on its seat.

The short lever arm 22—26 is used only to overcome this initial resistance. After the valve starts to leave its seat as shown in Fig. 3 the pressure of the medium becomes substantially uniform on the entire surface of the ball and only enough force to move the ball against the flow is necessary to remove it further from the seat. Accordingly the method of moving the ball from there on is changed in order to obtain an automatically accelerated rate of opening of the valve. This is accomplished by changing the slow rolling movement of the ball to a quick translatory movement and by increasing the length of the lever arm 22—26.

Continued movement of the ball in the direction of the arrow 40 (Fig. 3) moves its center 41 to one side of the seat axis 100 as shown in Fig. 4, the ball rolling on its fulcrum 16b until it is brought into engagement with another portion 23 of the actuator 21, in which position the lever 28 has arrived at the angular position 103.

Continued rotation of the actuator 21 from this stage (as illustrated in Fig. 5 where the operating lever 28 has arrived at a position indicated at 104) results in a different kind of movement of the ball 20, namely, a translatory movement along an arcuate path (indicated by the curved arrow 42), whose center of curvature is the pivotal axis 26. This movement carries the center of the ball across to the other side of axis 100 and the movement continues until the ball has reached its open-valve position shown in dotted lines in Fig. 1, which requires a movement of the lever 28 of substantially 90°. During its movement as shown in Fig. 5, the effective lever arm acting on the ball 20 is the distance from 41 to 26, which, it will be noted, is longer than the initial lever arm 22—26, Fig. 3. The shift from the short lever to the long lever in Fig. 4 results in automatically accelerating the rate of opening the valve.

When the operating lever 28 is moved from open to closed position the C-shaped arm 21 positively moves the ball back into the path of flow of the medium which then assists in carrying it to its seat where it is held in place by the differential pressure of the medium.

The ball is always within the encircling arm 21 which is always present to exert its various controls upon the movement of the ball, so that the ball is not free to move about in the valve chamber under influences other than that of its actuator, but is retained within the control of the actuator for positive actuation thereby from closed position to open position and back again.

It is unnecessary to provide any means in connection with shaft 26 or operating lever 28 to maintain the valve open, such as a latch or detent for lever 28, or screw threads between shaft 26 and the valve body. When the operator takes his hand off the lever 28 the valve is left either fully open or fully closed. It cannot be left cracked open or in some position intermediate the two extreme positions.

While I have shown and described a preferred form of the invention, it is to be understood that it is capable of variations and changes from the embodiment shown without departing from the spirit or scope of the invention.

I claim:

1. In a valve, a ball, a seat therefor, an actuator to remove said ball from said seat, a pivot for said actuator, said actuator having two portions adapted to engage said ball, said two portions being located at different distances from said pivot, the portion nearer the pivot engaging the ball first so that said actuator employs a relatively short lever arm to start said ball off said seat, the portion farther from the pivot subsequently engaging said ball to increase the length of the effective lever arm applied to said ball.

2. A valve comprising a chamber having a discharge orifice, a ball in said chamber adapted to seat on said discharge orifice, and an actuator in said chamber to remove said ball from said orifice, said actuator having a portion to engage said ball to impart initially a rolling movement thereto and a second portion to engage said ball subsequently to impart in conjunction with said first portion a translatory movement to said ball, whereby said actuator employs said first portion to start the ball rolling out of its seat and then having dislodged the ball and broken the differential pressure engages the ball with both portions and carries it away with an accelerated motion leaving the discharge orifice fully open for the unobstructed flow of the medium therethrough.

3. A valve comprising a chamber, a ball therein, a seat for said ball, the valve being closed when said ball contacts said seat, a claw in said chamber adapted to retain said ball within its grip to positively move said ball to and from said seat, said claw being movable in a plane containing the axis of said seat and having a portion adapted to engage said ball and pry said ball out of contact with one side of said seat using the other side of said seat as a fulcrum.

4. A valve comprising a chamber, a ball therein, a seat for said ball, the valve being closed when said ball contacts said seat, an actuator in said chamber oscillatable in a plane containing the axis of said seat and having a portion adapted to engage said ball and to pry said ball out of contact with one side of said seat using the other side of said seat as a fulcrum and to roll said ball on said fulcrum until said ball engages another portion of said actuator, said two portions of said actuator then operating to bodily carry said ball away from said seat.

5. A valve comprising a chamber, a ball therein, a seat for said ball the axis of said seat passing through the center of said ball when said ball is in contact with said seat, means for moving said ball out of contact with said seat including means operative first to move said ball so that the center of said ball travels to one side of said seat axis, and another means cooperating with said first means after said initial movement of said ball to move said ball so that the center of said ball travels across to the opposite side of said seat axis.

6. A valve comprising a chamber, a ball therein, a seat for said ball, the axis of said seat passing through the center of said ball when said ball is in contact with said seat, means for moving said ball out of contact with said seat, including means operative first to move said ball so that the center of said ball travels to one side of said seat axis, and another means cooperating with said first means after said initial movement of said ball to move said ball so that the center of said ball travels across to the opposite side of said seat axis, said latter movement continuing until the entire ball is on said opposite side of said seat axis.

MAX McFEE.